Patented Oct. 9, 1934

1,976,689

UNITED STATES PATENT OFFICE 1,976,689

TETRA SULPHURIC ACID ESTERS OF INDANTHRONES AND THEIR PRODUCTION

David Alexander Whyte Fairweather and John Thomas, Grangemouth, Scotland, assignors to Scottish Dyes, Limited, Grangemouth, Scotland No Drawing. Application March 5, 1930, Serial No. 433,498. In Great Britain March 7, 1929

19 Claims. (Cl. 260—31)

This invention relates to tetra-sulphuric-acid esters of indanthrones and process for preparing the same.

As a result of researches we have found among other things that in the oxidation of 2-amino-anthra-hydroquinone 9,10-disulphuric acid ester in alkaline media, it is possible to obtain and isolate a substance which appears to be the tetra sulphuric acid ester of tetrahydro indanthrone.

This is a very sensitive substance which, in contact with acid is converted to a reddish-violet substance. This appears to be the known disulphuric acid ester of dihydro indanthrone.

We have also discovered that the tetra-ester can be used for dyeing textile fibres and the like, development or fixation being effected for instance by hydrolysis and oxidation on the fibre for example by acid solutions of ferric chloride, cupric chloride, or other known methods for the development or fixing of sulphuric acid esters of vat dyestuffs.

This tetra-ester has an advantage over previously described esters of indanthrone in that it has much greater solubility.

As the tetra ester is so sensitive to acid it cannot readily be isolated by means of acid but may conveniently be isolated by precipitating with potassium chloride or other suitable salt. It can also be isolated by evaporation of the alkaline solution. Alternatively it can be salted out or evaporated from neutral solution. We regard this isolation stage as of substantial importance.

In addition to the ester of 2-amino-anthrahydroquinone substituted derivatives may be used, including those in which one of the hydrogen atoms of the amino group are replaced, but excluding those which have the substituent in the alpha position adjacent to the amino group.

The esters obtained from these substituted bodies appear to be tetra esters and we have found that they may be used instead of the tetra ester obtained from the ester of amino-anthra-hydroquinone.

Further to the above we have found that in the alkaline oxidation of the disulphuric ester of the amino anthra-hydro-quinone of commercial purity it is possible to take the solution of the ester obtained after oxidation and to separate it into one or more products. By this means we obtain an ester which is of high degree of purity and has the advantage that it gives brilliant blue dyeings on the fibre; in fact, dyeings can be obtained equal in brightness to those obtained from specially purified dianthraquinone-1:2:2'1'-dihydroazine. The purification is preferably effected by a fractional crystallization and we have found the potassium salts very suitable for this purpose.

By the methods of isolation from the yellow solutions obtained by alkaline oxidation of β-amino-anthrahydroquinone-9,10-disulphuric acid ester or its substituted derivatives of solid yellow crystalline bodies, presumably sulphuric acid esters of dianthraquinonyl-1, 2, 1', 2'-dihydroazine or its derivatives, small quantities of impurities unavoidably remain in the product. The presence of these impurities is not greatly detrimental to the brightness of shade on cotton but tends to produce dull shades on animal fibres. We have found that these impurities may be removed by means of a solvent such as methyl or ethyl alcohol in which the impurities are soluble but the required product is insoluble. This result is unexpected as the by-products which are themselves presumably potassium salts of sulphuric acid esters, are partly less soluble and partly more soluble in water than the yellow ester itself.

The invention in brief consists in a process for the production of sulphuric and like esters of vat dyestuffs according to which a disulphuric or like ester of 2-amino-anthrahydroquinone or the like including derivatives and substitution products and particularly 2-amino-anthra-hydroquinone-9,10-disulphuric acid ester is submitted to oxidation in the presence of an alkali and the product is isolated as such for example, by precipitation with potassium chloride or the like evaporation or salting out and evaporation from a neutral solution.

The invention also consists in a process referred to above which includes (a) the isolation of the aforesaid yellow compound along with some impurities, (b) a fractional isolation which gives the yellow compound substantially free from impurities and the purification of the product thus obtained by recrystallization, (c) the use of a further method of purification employing for example alcohol.

The invention also consists in a method which comprises the production of a solid substance, a paste or powder, or suspension or the like, as distinct from a solution, which comprises the treatment of a yellow solution made as indicated above, or may be made in any other way as long as it is a solution substantially as indicated above, in any suitable way for converting it into a solid substance, as referred to above, especially such a treatment as removes undesired reaction products, this treatment either being a single stage treatment, or a treatment in two or more stages.

The invention also consists in a process as indicated above in which the impurities are removed by means of a solvent such as methyl or ethyl alcohol in which the impurities are soluble but the required product is insoluble.

The invention also consists in processes substantially as herein described for the production of vat dyestuff esters.

The following examples illustrate how the invention may be carried into effect, references to parts and to percentages being to parts and percentages by weight.—

*Example 1*

This deals with a method of preparing what appears to be the tetra sulphuric ester of tetra hydroindanthrone.

42.9 parts of sodium salt of beta-amino-anthra-hydroquinone disulphuric acid ester are dissolved in water together with 5 parts caustic soda, and a solution containing 7.4 parts sodium hypochlorite added slowly at 15° C. with stirring and cooling. The resulting solution contains what has been referred to above as the tetra sulphuric acid ester of tetra hydroindanthrone.

*Example 2*

A solution prepared as in Example 1 is evaporated until a concentrated solution is obtained and the solution saturated with potassium chloride.

The precipitate which forms is filtered off.

*Example 3*

Instead of isolating by the method of Example 2 the solution may be completely evaporated to dryness.

Evaporation can be carried out under ordinary pressure or preferably under vacuum or in a spray drier.

*Example 4*

3,600 parts of liquor containing 429 parts of the sodium salt of beta-amino-anthra-hydroquinone disulphuric acid ester and 72 parts of caustic soda are cooled to 0° and 950 parts of sodium hypochlorite liquor of 10 per cent. strength run in slowly with rapid stirring so that the temperature does not exceed 5° C. When the addition is complete the mixture is stirred for 15 minutes, and 10 parts of sodium sulphite are added to destroy any remaining hypochlorite. This solution is treated as in Example 3.

*Example 5*

Instead of adding sodium hypochlorite liquor as in the previous example, the hypochlorite may be formed in situ by passing into the liquor, to which has been added an additional 103 parts of caustic soda, 91 parts of chlorine at a temperature 0° to 5° C.

*Example 6*

This is an example of the use of sulphuric ester of a substituted β-amino-anthraquinone.

464 parts of the sodium salt of 2-amino-3-chlor anthrahydroquinone disulphuric acid ester are used, and the treatment with hypochlorite carried out as in Examples 4 or 5.

The product (tetra ester or 3,3'-dichlor-tetra-hydroindanthrone) is contained in a deep reddish-brown solution and is separated as described in Example 3.

*Example 7*

The solution obtained in Example 6 may be salted out by the addition of 40 to 50 per cent. of potassium carbonate and the paste obtained by filtration used for dyeing after dissolving in water.

*Example 8*

This describes the production of a solution of the yellow compound.

46 parts of the potassium salt of β-amino-anthrahydroquinone disulphuric acid ester are dissolved in water together with 5 parts of caustic soda and then a solution containing 7.4 parts of sodium hypochlorite is slowly added at 15° C. with good stirring and cooling so that the temperature does not rise above the 15° C.

*Example 9*

This is an example of the separation of the pure material from the product obtained in Example 8.

The solution from this example is evaporated until its mass is reduced to about 600 parts (alternatively the amount of water used in Example 8 may be chosen so that no evaporation is necessary). When the mass of the solution is correct, sufficient potassium chloride is added until the solution contains about 75 parts of potassium. The liquor is cooled and filtered. The filtrate is then saturated with potassium chloride and allowed to stand for several hours when the yellow ester is precipitated in crystalline form and of high purity. These crystals are filtered off and sucked dry.

*Example 10*

This example describes a modified method of isolating the pure product.

After evaporating the solution, as already described in Example 9, this solution is saturated with potassium chloride while hot. After saturation it is filtered at a temperature of 70°–80°. By this means the by-products of less solubility remain behind. The filtrate is allowed to cool, when a thick brown precipitate separates, which is filtered off and sucked dry as before.

*Example 11*

The liquor obtained as in Example 4 is treated with 1,000 parts of potassium chloride and filtered cold, the residue being washed with saturated potassium chloride solution. To the combined washings and filtrate is added a further 1,000 parts of potassium chloride. The precipitate that separates on cooling is filtered off.

*Example 12*

This is an example of the further purification of the product obtained in Examples 2, 3 and 11. The dyestuff paste is dissolved in sufficient water to allow of complete solution at about 50° C. It is filtered from any foreign matter and reprecipitated by the addition of potassium chloride or potassium carbonate. The paste is washed on the filter with saturated potassium chloride.

*Example 13*

The yellow crystalline product obtained as in Examples 9 and 10 above is dried and extracted continuously with methyl alcohol until no further material is dissolved out. The residue is yellow in color and consists of the starting material in a state of very high purity. The alcoholic liquor contains almost none of this product.

*Example 14*

A solution or suspension obtained as in Example 9 or 10 and containing, for instance, about 5 per cent. of it, is mixed with about an equal volume of ethyl alcohol and allowed to stand overnight. The impurities remain in solution and the required yellow ester is almost completely precipitated in crystalline form. It is filtered off and may be washed with alcohol, till the washings are colorless.

*Example 15*

Instead of drying the material before extraction as in the preceding example, the damp ester may be washed on the filter with alcohol or alternately stirred to a paste with alcohol and filtered.

It should be noted that the processes of the above three examples are only designed to remove impurities which may dull the shade of dyeings and that inorganic salts may remain in the final product, these having no deleterious effect.

*Example 16*

To the oxidized liquor obtained as in Example 6 is added 25 per cent. of its weight of potassium chloride. The matter is stirred for several hours in the cold and filtered, the cake being washed with a saturated solution of potassium chloride. To the combined filtrates and washings is now added 15 per cent. of sodium hydroxide, sodium carbonate, potassium hydroxide or potassium carbonate, and the liquid allowed to stand 12 hours at ordinary temperature. It is then filtered and the cake is lifted and is stirred at 60° C. with 650 parts of ethyl alcohol for one hour. On cooling, what is presumably the tetra ester of dichlor tetra hydro indanthrone crystallizes out in pure form. It is filtered off and washed on the filter with cold ethyl alcohol until the runnings are nearly colorless.

The chemically equivalent quantity of the potassium salt of β-amino-anthra-hydroquinone di-sulphuric acid ester may be used in Example 1 in place of the sodium salt referred to therein and the resulting product employed instead of the product of Example 1.

Some of the products obtained by the process of separation referred to above do not give a blue vat dyestuff under the conditions described. That residue which crystallizes out first does so in the form of brownish crystals. The filtrate remaining after separating the pure body is also brown in color, and contains material of high solubility.

The methods of preparing the pure body referred to above are not confined to the process starting from 2-amino-anthrahydroquinone-9, 10-disulphuric ester, but may be used for substantially similar products obtained or obtainable from substituted derivatives of this body, for example, from 2-amino-3-chlor-anthraquinone esters.

The invention includes a yellow solid body, especially a substantially pure body, for instance, in the form of crystals, reference principally being made to the yellow solid referred to herein.

In this specification and claims unless the context otherwise requires, esters of substituted bodies may be used instead of the ester of amino-anthra-hydroquinone, the invention including tetra esters other than that obtained from 2-amino-anthrahydroquinone-9,10-disulphuric acid ester.

In this specification and claims the term "indanthrone" has the broad interpretation that is it includes the azine and dihydroazine forms.

Having now described our invention, what we claim as new and desire to secure by Letters Patent is:—

1. A process for the production of tetrahydro-indanthrone tetrasulphuric acid esters which consists in oxidizing a 2-aminoanthrahydroquinone disulphuric acid ester in the presence of an alkali and isolating the tetrahydro-indanthrone tetra sulphuric acid ester, whilst preventing the medium from becoming acid.

2. A process as claimed in claim 1 in which the isolated product is purified by extraction with an alcohol of the general formula $C_nH_{2n+1}OH$ in which $n$ is a whole number less than 3.

3. A process for the production of tetrahydro-indanthrone tetrasulphuric acid ester which consists in oxidizing 2-aminoanthrahydroquinone disulphuric acid ester in the presence of an alkali and isolating the tetra hydro-indanthrone tetrasulphuric acid ester whilst preventing the medium from becoming acid.

4. A process as claimed in claim 3 in which the isolated product is purified by extraction with an alcohol of the general formula $C_nH_{2n+1}OH$ in which $n$ is a whole number less than 3.

5. A process for the production of 3:3'-dichloro-tetrahydro-indanthrone tetrasulphuric acid ester which consists in oxidizing 2-chloro-3-aminoanthrahydroquinone disulphuric acid ester in the presence of an alkali and isolating the 3:3'-dichlorotetrahydro-indanthrone tetrasulphuric acid ester whilst preventing the medium from becoming acid.

6. A process as claimed in claim 5 in which the isolated product is purified by extraction with an alcohol of the general formula $C_nH_{2n+1}OH$ in which $n$ is a whole number less than 3.

7. A process for the production of tetrahydro-indanthrone-tetrasulphuric acid esters which consists in oxidizing a 2-amino-anthrahydroquinone-disulphuric acid ester in the presence of an alkali and isolating the tetrahydro-indanthrone-tetrasulphuric acid ester together with some impurities while preventing the medium from becoming acid, in which the isolation is effected by increasing the alkali metal content of the solution.

8. A process for the production of tetrahydro-indanthrone-tetrasulphuric acid esters which consists in oxidizing a 2-amino-anthrahydroquinone-disulphuric acid ester in the presence of an alkali and isolating the tetrahydro-indanthrone-tetrasulphuric acid ester together with some impurities while preventing the medium from becoming acid, in which the isolation is effected by evaporation.

9. A process for the production of tetrahydro-indanthrone-tetrasulphuric acid esters which consists in oxidizing a 2-amino-anthrahydroquinone-disulphuric acid ester in the presence of an alkali and isolating the tetrahydro-indanthrone-tetrasulphuric acid ester together with some impurities while preventing the medium from becoming acid, in which the isolation is effected by salting out.

10. A process for the production of tetrahydro-indanthrone-tetrasulphuric acid esters which consists in oxidizing a 2-amino-anthrahydroquinone-disulphuric acid ester in the presence of an alkali and isolating the tetrahydro-indanthrone-tetrasulphuric acid ester together with some impurities while preventing the medium from becoming acid, in which the isolation is effected by the addition of potassium chloride.

11. A process for the production of tetrahydro-indanthrone tetrasulphuric acid esters which consists in oxidizing a 2-aminoanthrahydroquinone disulphuric acid ester in the presence of an alkali and isolating the tetrahydroindanthrone tetrasulphuric acid ester whilst preventing the medium from becoming acid and re-crystallizing the product thus obtained.

12. A process for the production of tetrahydro-indanthrone tetrasulphuric acid esters which consists in oxidizing a 2-aminoanthrahydroquinone disulphuric acid ester in the presence of an alkali and isolating the tetrahydroindanthrone tetrasulphuric acid ester whilst preventing the medium from becoming acid and further purifying the product thus obtained.

13. A process for the production of tetrahydro-indanthrone tetrasulphuric acid ester which consists in oxidizing 2-aminoanthrahydroquinone disulphuric acid ester in the presence of an alkali and isolating the tetrahydroindanthrone tetrasulphuric acid ester whilst preventing the medium from becoming acid and re-crystallizing the product thus obtained.

14. A process for the production of the tetrahydro-indanthrone tetrasulphuric acid ester which consists in oxidizing 2-aminoanthrahydroquinone disulphuric acid ester in the presence of an alkali and isolating the tetrahydro-indanthrone tetrasulphuric acid ester whilst preventing the medium from becoming acid and further purifying the product thus obtained.

15. A process for the production of 3:3'-dichlorotetrahydro-indanthrone tetrasulphuric acid ester which consists in oxidizing 2-chloro-3-aminoanthrahydroquinone disulphuric acid ester in the presence of an alkali and isolating the 3:3'-dichlorotetrahydro-indanthrone tetrasulphuric acid ester whilst preventing the medium from becoming acid, and re-crystallizing the product thus obtained.

16. A process for the production of 3:3'-dichlorotetrahydro-indanthrone tetrasulphuric acid ester which consists in oxidizing 2-chloro-3-aminoanthrahydroquinone disulphuric acid ester in the presence of an alkali and isolating the 3:3'-dichlorotetrahydro-indanthrone tetrasulphuric acid ester whilst preventing the medium from becoming acid and further purifying the product thus obtained.

17. A yellow crystalline compound being a tetrasulphuric acid ester of the tetrahydro-indanthrone type such as may be produced by oxidizing in an alkaline medium 2-aminoanthrahydroquinone-9-10-disulphuric acid ester and isolating the product from an alkaline medium, and being a compound which in contact with acid is converted to a reddish-violet substance and which can be used for dyeing textile fibres and the like by development by hydrolysis and oxidation on the fibre by acid solutions of cupric chloride.

18. 3:3'-dichlorotetrahydro-indanthrone tetrasulphuric acid ester.

19. Tetrahydro-indanthrone tetrasulphuric acid esters in isolated form.

DAVID ALEXANDER WHYTE FAIRWEATHER.
JOHN THOMAS.